United States Patent Office 3,046,280
Patented July 24, 1962

3,046,280
PRIMARY, SECONDARY AND TERTIARY AMINES HAVING A SPASMOLYTIC EFFECT AND METHOD OF PRODUCING THESE COMPOUNDS
Teunis Kralt and Jan van Dijk, Weesp, Netherlands, assignors, by mesne assignments, to North American Philips Company, Inc., New York, N.Y., a corporation of Delaware
No Drawing. Filed Oct. 19, 1956, Ser. No. 616,958
Claims priority, application Netherlands Nov. 24, 1955
1 Claim. (Cl. 260—293)

The invention relates to new primary, secondary and tertiary amines, of which one or two of the hydrogen radicals bound to nitrogen may be a saturated or unsaturated, aliphatic, mixed aliphatic-alicyclic, mixed aliphatic-aromatic or mixed aliphatic-heterocyclic radical. The nitrogen atom may furthermore form part of a heterocyclic ring. The third radical bound to the nitrogen atom is always a saturated or unsaturated, aliphatic or mixed aliphatic-alicyclic radical.

There are already known secondary and tertiary amines, which have a saturated aliphatic radical bound to their nitrogen atom, for example, methyl hexylamine, methyl-octylamine, methyl dioctylamine or a mixed aliphatic-alicyclic radical and which has furthermore an alkyl group, in which the alkyl radical consists of a comparatively low number of carbon atoms. Examples of these compounds are: N-propyl-2-cyclopentyl ethylamine, N - methyl - 1 - (2 - methyl cyclohexyl) methylamine, N-methyl-N-bis (2-cyclohexyl ethyl) amine.

There are furthermore known secondary and tertiary amines of the type $R_1N(R_2C_6H_5)_2$, wherein $R_1$ and $R_2$ designate a lower aliphatic hydrocarbon radical or $R_1$ represents a hydrogen atom.

There are, moreover, known saturated derivatives of ethyl amine of the general formula:

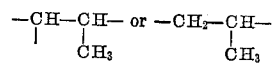

wherein $R_1$ denotes an alkyl radical containing six carbon atoms, $R_2$ hydrogen or a lower alkyl radical and $R_3$ an alkyl radical containing 1.3 or 5 carbon atoms or a cyclo-alkyl radical.

The formula indicated in the preceding paragraph may also represent compounds in which $R_1$ is an alkenyl radical with four carbon atoms and $R_3$ a lower alkyl, lower alkenyl, a cyclo-alkyl or an aralkyl radical. $R_2$ has, for these compounds, the designation given in the preceding paragraph.

Many of the aforesaid compounds are said to have a pharmacologic, for example spasmolytic effect.

It may finally be observed that a compound of the formula

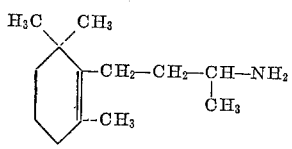

is employed as an intermediate for the production of insoluble penicillin salts.

In accordance with the invention it has now been found that compounds having a spasmolytic effect are obtained, when primary, secondary or tertiary amines of the general formula

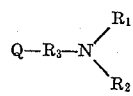

are produced. In this formula: Q designates a saturated or unsaturated, aliphatic or mixed aliphatic-alicyclic radical composed of two or three isoprene residues, $R_1$ designates a hydrogen atom, an alkyl- or aralkyl-radical and $R_2$:

(a) A hydrogen atom, or
(b) An alkyl, an aryl or an aralkyl radical, in which a hydrogen atom may have been replaced by a hydroxyl- or etherified hydroxyl group, or
(c) An alicyclic, mixed aliphatic-alicyclic, a heterocyclic or mixed aliphatic-heterocyclic radical. Furthermore $R_1$ and $R_2$ may form with the nitrogen atom a heterocyclic ring. $R_3$ is one of the radicals

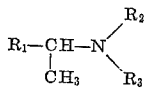

The radical Q—$R_3$— may designate one of the following radicals: α-ionyl (Formula A), dihydro-α-ionyl (Formula B), β-ionyl (Formula C), dihydro-β-ionyl (Formula D), tetrahydro-α- or -β-ionyl (Formula E), dihydro-ψ-ionyl (Formula G), tetrahydro-ψ-ionyl (Formula H), hexahydro-ψ-ionyl (Formula J), 1,5-dimethyl-7-(2',6',6'-trimethyl-cyclohexene-1-yl) heptyl Formula K).

$R_1$ may for example be a methyl- ethyl-, propyl- iso-propyl-, butyl-, 1-methylpropyl-, or 3-methylbutyl- radical or, if this symbol represents an aralkyl-radical, a benzyl-, 2-phenyl-ethyl, or a 1-methyl-2-phenyl-ethyl- radical. In this respect it may be noted that in vitro experiments have shown that the positions and the number of the double bonds in the radical Q—$R_3$— have no great effect on the spasmolytic action of the compounds according to the invention. $R_2$ may designate the same as $R_1$. For $R_2$ the radicals mentioned in the preceding paragraph may therefore be taken as examples. Of the other radicals which may be represented by $R_2$ may be mentioned:

(a) An alkyl-, or aralkyl-radical, of which one hydrogen atom is replaced by a hydroxyl- or etherified hydroxyl-radical:

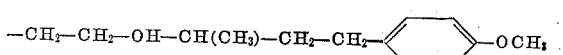

(b) An alicyclic radical: cyclohexyl- or 3,3,5-trimethyl-cyclohexyl;
(c) A mixed aliphatic-alicyclic radical: 1-methyl-3-[2', 6',6'-trimethyl-cyclohexene-1'-yl] propyl-
(d) A heterocyclic radical: pyridyl-2-
(e) A mixed aliphatic-heterocyclic radical: furfuryl.

As examples of the cases in which the groups $R_1$ and $R_2$ form a hetero-cyclic ring with the nitrogen atom may be mentioned: 2-methylpyridyl, piperidyl-, morpholyl.

The compounds according to the invention have, in vitro, a spasmolytic activity of muscolotropic nature, which is 16 times that of papaverine also in vitro. The tested primary amines proved to have an effect in vitro which is 2 to 4 times that of papaverine. With the secondary amines compounds are found which have a greater activity than the primary amines. To this group of compounds belong, for example, substances with an activity 5 to 6 times that of papaverine. Compounds with the greatest spasmolytic activity in vitro are found among the tertiary amines. With one of these substances even an activity of 16 times that of papaverine was measured.

Of the secondary amines are to be mentioned particularly those compounds of the general formula:

$$Q-R_3-NH-R_2$$

in which $R_2$ designates an alkyl radical with at least 5 carbon atoms or a cyclohexyl, a mixed aliphatic-alicyclic or an aralkyl radical. Of the latter two radicals the aliphatic part contains preferably 1 to 6 carbon atoms. To this group of compounds are to be considered those in which a hydrogen atom of the alkyl- or aralkyl radical is replaced by a hydroxyl or etherified hydroxyl-group. The radical Q—R$_3$— has in these compounds the designation indicated with the definition of the compounds according to the invention. $R_2$ may represent in these secondary amines for example one of the following radicals: 3-methylbutyl-1,3-dimethylbutyl; cyclohexyl; 3,3,5-trimethylcyclohexyl; 1-methyl-3-(2',6',6'-trimethyl-cyclohexene-1'-yl) propyl; 2-phenylethyl; 1-methyl-2-phenylethyl; 1-methyl-3-(4'-hydroxyphenyl) propyl or the corresponding methoxy-compound of the last-mentioned substance. The secondary amines of the aforesaid type have, in vitro, an activity which is 5 to 7 times that of papaverine.

Of the tertiary amines of the general formula:

$$Q-R_3-N\begin{matrix}R_1\\R_2\end{matrix}$$

particularly those are important in which $R_1$ is an alkyl radical with 1 to 3 carbon atoms and $R_2$ an alkyl radical with 1 to 6 carbon atoms or an aralkyl radical, of which the aliphatic part contains more than one carbon atom. To these tertiary amines must be considered to belong also those of which the radicals $R_1$ and $R_2$ form a piperidine ring with the nitrogen atom.

As examples may be mentioned the compounds in which:

$R_1$ and $R_2$ are both methyl, $R_1$ is methyl and $R_2$ is ethyl, propyl, isopropyl or 3-methylbutyl; $R_1$ is ethyl and $R_2$ is ethyl-propyl, isopropyl, butyl- 2-methylbutyl,4-methylpentyl, 1,3-dimethylbutyl or 1-methyl-2-phenylethyl; $R_1$ is propyl and $R_2$ is propyl or isopropyl; $R_1$ and $R_2$ form with the nitrogen atom, a piperidine- or 2-methyl-piperidine ring. The radical Q—R$_3$— is in these examples a dihydro-β-ionyl (see Formula D), a tetrahydro-ψ ionyl (see Formula H) or a hexahydro-ψ-ionyl radical (see Formula I). The tertiary amines belonging to this group of compounds have, in vitro, an activity which is 7 to 16 times that of papaverine.

Of these tertiary amines a few excel by their activity in vivo which is a few times that of papaverine in vivo. For these compounds the radical Q—R$_3$— is a ψ-ionyl radical, of which, if desired, one or more double bonds are hydrogenized, $R_1$ is again an alkyl radical with 1 to 3 carbon atoms and $R_2$ an alkyl radical with 1 to 6 carbon atoms or an aralkyl radical, of which the aliphatic part contains 1 to 6 carbon atoms. Reference is particularly made to those tertiary amines, in which the radical containing the group Q—R$_3$— is formed by a tetrahydro-ψ-ionyl radical (Formula H).

The compounds may be tested by the Von Magnus' method (the principle of which is described in Pflügers Archiv 102, page 123 (1904) in two different ways.

In accordance with the first method an aqueous liquid, in which is provided a piece of intestine serving as the test specimen, has added to it acetyl choline and then the compound to be tested. In accordance with the second method the liquid has first added to it the compound to be tested and not until then the acetyl choline. The numbers indicated in the tables (1–10) are mean values of a series of tests. In all these tables "activity" means the spasmolytic activity with respect to acetyl choline. The activity of papaverine is considered as a standard (=1).

For the production of the compounds according to the invention various known methods may be employed. In general, reference may be made to Houben Weyl: Die Methoden der organischen Chemie, third ed., vol. 4, pages 345 to 508, where methods for the production of primary and secondary amines are described. The production of the tertiary amines is described in the same volume on pages 643 to 731.

Of the various methods the following may be particularly employed for the production of the compounds according to the invention:

I. The Leuckart method: In this method a ketone or an aldehyde is caused to react with ammonia, a primary or secondary amine in the presence of formic acid, or the ammonium salt or the amide thereof.

With this reaction a formyl compound is produced in the first place. This formyl residue bound to nitrogen may be separated out by boiling it with diluted acid, for example diluted hydrochloric acid or sulphuric acid, or with alkaline, for example 30% caustic soda lye. The separation with the aid of acids yields, in general, better results than that with the aid of lye. As a rule satisfactory results are obtained by adding 90% formic acid to the mixture of ketone or aldehyde and ammonia, primary or secondary amine.

The quantities of ketone/aldehyde on the one hand, ammonium formate or formic acid and the like on the other hand are usually chosen to be such that they have a molar ratio of 1:4 to about 1:5. However, larger quantities of ammonium formate or formic acid and the like may be used, for example in a ratio of 1:16. The reaction is most furthered by carrying it out at a temperature of 150 to 200° C. At this temperature, as a rule, solvents may be dispensed with. If the reaction mixture contains a comparatively large quantity of formamide, this serves at the same time as a solvent in the temperature range given. For further details of the Leuckart method reference may be made to Organic Reactions of Roger Adams, vol. V, page 302, particularly page 316. For the production of the compounds according to the invention by this Leuckart method, the starting material may be both ketones of the general formula $$Q-CH_2-\underset{CH_3}{C}=O \text{ or } Q-CH-\underset{CH_3}{C}=O$$

and amines of the formula $HN.R_1.R_2$ or salts thereof on the one hand and ketones or aldehydes and amines of the general formula Q—R$_3$—NH—R$_2$ on the other hand.

Compounds according the invention may be obtained for example by causing β-ionone to react with ethyl amine under the conditions indicated for the Leuckart method. These compounds may, however, be produced by the same method by causing acetaldehyde to react with β-ionyl amine (2-amino 4-(2',6',6'-trimethylcyclohexene-1) butene-3. In the same manner α-ionyl methylamine may be obtained from α-ionone and methyl amine. Although the Leuckart reaction may be employed also for the production of primary and tertiary amines, this method was used in accordance with the invention only for the production of some secondary amines. It should finally be noted that with the Leuckart reaction no reduction of any double bonds between carbon atoms takes place. Should the presence thereof be undesirable, this or these double bond(s) may be hydrogenized either in the final product or in the starting material to be used with the aid of hydrogen in the presence of a metal catalyst, for example finely divided platinum, palladium, Raney nickel.

II. Reductive alkylation of ammonia or a primary or secondary amine with hydrogen, a metal catalyst and an aldehyde or a ketone: By this method alkyl radicals and, if desired also mixed aliphatic-aromatic or mixed aliphatic-alicyclic or mixed aliphatic-hetero-cyclic radicals are introduced into ammonia and primary or secondary amines by causing ammonia or the amines to react with the aldehydes or ketones concerned of the compounds mentioned above in the presence of hydrogen and a metal catalyst. The reaction is, as a rule, carried out in an alcoholic solvent, preferably ethanol. As a catalyst use may be made of Raney nickel, platinum or palladium. The hydrogenation in the presence of Raney nickel must be carried out under alkaline conditions, for example at a pH of 8 to 12, since in the case of acids the catalyst is readily decomposed. With Raney nickel the primary amines may be produced at room temperature under atmospheric pressure. For the production of the secondary or tertiary amines in the presence of this catalyst, often higher temperatures, for example 40° C. to 150° C. and higher pressures are desired in order to obtain a maximum yield, for example a pressure between 20 and 150 atmospheres. Under these severer conditions double bonds in the starting material can be completely hydrogenated, which is not the case when carrying out the reduction with the aid of hydrogen under the action of Raney nickel at room temperature under normal pressure.

The use of high pressure requires the use of autoclaves, which is in most cases undesirable. If platinum or palladium is used as a catalyst, the hydrogenation may be carried out at room temperature and under normal pressure in order to produce the completely hydrogenized secondary and tertiary amines.

The hydrogenation with the aid of platinum or palladium may be carried out in alkaline, neutral and acidic milieu. If one of the reaction componets, for example $\alpha$- or $\beta$-ionone contains one or more double bonds, no complete hydrogenation of the double bonds takes place in alkaline or neutral milieu. Thus only the exocyclic double bonds of the said compounds are hydrogenized. However, if the hydrogenation is continued in acidic milieu, for example by adding hydrochloric acid, or if the reaction is caused to take place from the beginning in acidic milieu, for example at a pH of about 1 to 3, all double bonds are hydrogenized. For further details reference may be made to Org. Reactions of Roger Adams, vol. IV, pages 174 and ff.

Also with these alkylation reactions the starting material may belong to two different series of compounds. On the one hand a ketone of the formula

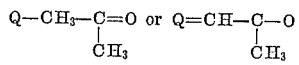

for example, $\alpha$-, $\beta$- or $\psi$-ionone may be caused to react with ammonia, a primary or secondary amine of the formula $HN.R_1R_2$ (wherein $R_1$ and $R_2$ have the meaning indicated above, for example methyl-amine, ethyl-amine, 3-methylbutyl-amine), but the starting material may also be primary or secondary amines of the formula

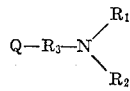

which is caused to react with aldehydes or ketones, of which the carbon skeleton corresponds to that of the radical to be bound to nitrogen, in which aldehyde or ketone the oxygen atom is bound to that carbon atom which is bound to nitrogen in the product to be obtained.

By this method for example from $\alpha$-ionone and ammonia: dihydro-$\alpha$-ionyl-amine, from tetrahydro $\psi$-ionone and ammonia: tetrahydro-$\psi$-ionyl-amine, from $\beta$-ionone and isoamylamine: N-isoamyl-dihydro-$\beta$-ionyl-amine may be obtained by catalytic hydrogenation. In a similar manner from dihydro-$\beta$-ionyl-amine and methyl-ethyl-ketone: N. sec. butyl-dihydro-$\beta$-ionyl-amine, from dihydro-$\beta$-ionyl-amine and anisal-acetone: N-(p-methoxyphenyl-sec. butyl)-dihydro-$\beta$-ionyl-amine, from dihydro-$\alpha$-ionyl-amine and furfural: N-furfural-dihydro-$\alpha$-ionyl-amine may be obtained. If the starting material contains one or more double bonds, they may be hydrogenized by the reduction. If the starting material is for example pseudo-ionone, the two conjugated double bonds are reduced and if the starting material is an $\alpha$- or $\beta$-ionone derivative only saturation of the exocyclic double bond takes place. If it is not desirable to hydrogenize the double bonds, they may be protected, before the reduction takes place, for example by the addition of hydrogen halide or halogen, preferably hydrogen bromide or bromine to the double bond. When the reduction is completed, the double bond can be restored by splitting off the molecules added on under the action of an agent which is able to split off hydrogen halide for example tertiary amines, as collidine, pyridine, di-ethylaniline or calcium oxide.

III. Alkylation of ammonia, a primary or secondary amine by means of an organic halogenide.—This reaction is preferably carried out in a manner such that the halogenide is reacted with ammonia, a primary or secondary amine, dissolved in a lower aliphatic alcohol, for example, in ethanol or in a further suitable solvent not reacting with the reaction components, for example, benzene, toluene. The choice of the temperature and of the solvent may have a fairly great effect on the composition of the final product. In general, an adequate excess quantity of ammonia will be used for the production of the primary amine in order to prevent the formatio nof unduly large quantities of secondary or tertiary amines.

It may be advisable to add to the reaction mixture a substance which is capable of binding the hydrogen halide which is set free. To this end an inorganic base, for example, KOH, NaOH or CaO may be used.

As an alternative, an excess quantity of the amine provided may be used as an acid binder. In some reactions the halogen atom is rather immovable in one reaction component. This applies for example to the case in which an amine is reacted with 2Br-pyridine. Then it is advantageous to add to the reaction mixture lithium amide.

For the production of the compounds according to the invention by this method III, primary or secondary amines of the formula:

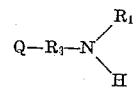

may be caused to react with a halide of the formula $R_2Hlg$, wherein the halogen atom is bound to the carbon atom, which is bound to nitrogen in the molecule to be produced. Examples thereof are the reactions between dihydro-$\beta$-ionyl amino and -2-bromine pyridine in the presence of lithium amide, between dihydro-$\alpha$-ionyl amine and isoamyl-bromide, between N-methyl-dihydro-$\beta$-ionyl amine and benzyl-chloride in the presence of solid potassium hydroxide. However, as an alternative, a halide of the formula Q—$R_3$—Hlg may be caused to react with ammonia, a primary or a secondary amine. The reaction may be carried out under the same conditions as those indicated above. Examples of this reaction are those between tetrahydro-$\beta$-ionyl bromide and piperidine, between hexahydro-$\psi$-ionyl bromide and diisopropyl amine at a temperature of 250° C. and under increased pressure, between tetrahydro-$\beta$-ionyl bromide and 2-aminopyridine in the presence of lithium amide.

IV. Reduction of oximes of ketones of the formula:

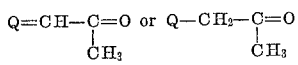

This reaction may for example be carried out by reducing the oxime for example of α-, β- or ψ-ionone with sodium in ethanol at boiling temperature. With the latter reaction it may be advantageous to add acetic acid during the reduction.

The reduction may, as an alternative, be carried out with a complex metal hydride containing two metal atoms, for example, lithium-aluminum hydride or sodium-boron-hydride.

V. Reduction of acylated primary or secondary amines: If primary or secondary amines of the formula:

$$Q-R_3-NH_2, Q-R_3-NH-X$$

wherein X represents the radical $R_1$ or $R_2$, are acylated and the acyl compounds obtained are reduced by means of a complex metal hydride containing two metal atoms, for example, lithium-aluminum hydride, or sodium-boron hydride, secondary or tertiary amines are produced. Thus, for example, after the acylation of a compound of the formula:

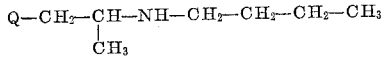

with acetic acid anhydride, followed by the reduction by means of one of the said reducing agents, a compound of the formula:

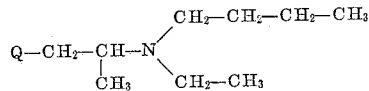

is obtained. If the acylation is carried out by means of propionic acid or the acid halide thereof, for example the acid chloride, the corresponding tertiary butyl-propyl amine is obtained after reduction. The reduction is carried out preferably in aliphatic ethers for example in a solution of diethyl ether.

For the production of the primary, secondary or tertiary amines according to the invention these five methods may be explained further as follows:

A. Production of primary amines: These compounds cannot be produced by the method V, but they can be produced by all methods I to IV. A very suitable method is that described under II. Favourable results are also obtained by method IV. Although method III may be carried out, it has frequently the disadvantage that it yields a mixture of primary, secondary and tertiary amines, which cannot always be separated into its components.

B. Production of secondary amines: These compounds can, in principle, not be produced by method IV, which method yields only primary amines. However, all methods I to III and V may be employed. Very satisfactory results are usually obtained by carrying out method II.

Also to the secondary amines applies the remark made above for the primary amines with respect to method III, i.e. that by this method a mixture of primary, secondary and tertiary amines is obtained, which is split into its components with difficulties only.

It may furthermore be pointed out that the acylation of primary amines, followed by a reduction according to method V, is very suitable as a method of preparing of secondary amines.

C. Production of tertiary amines: As stated above, according to method IV only primary amines are produced, so that this method is not suitable for the production of tertiary amines. In accordance with a preferred embodiment of the invention, the tertiary amines are produced by reduction of the acylated corresponding secondary amines. The compounds according to the invention may, as an alternative, be produced in a suitable manner from secondary amines by causing these compounds to react with halides of the groups $R_1$ or $R_2$, of which the halogen atom reacts readily with the hydrogen atom of the secondary amines.

A. PRIMARY AMINES

*Example 1*

DIHYDRO-α-IONYL AMINE

*1-methyl-3-(2',6',6'-trimethyl-cyclohexene-2'-yl) propyl amine (Formula I, method II).*—60 gs. of ground Raney nickel was activated by treating it with 50% aqueous caustic soda lye, then washed with water and then with ethanol. To this catalyst was added a solution of 77 gs. of α-ionone (0.4 mol) +60 mls. of concentrated ammonia (0.8 mol) in 250 mls. of absolute ethanol. This mixture was hydrogenized at normal temperature and pressure. The absorption of hydrogen was 21.15 ls. (i.e. 15% more than the quantity theoretically required). After having sucked off the reaction mixture, the alcohol was evaporated. The residue was rendered acidic with 38% hydrochloric acid dissolved in 2.5 ls. of water. This solution was washed first with 250 mls. and then with 100 mls. of diethyl ether. The water layer was rendered alkaline and extracted twice with 250 mls. of ether. The latter ether extracts were dried on sodium sulphate, the ether was evaporated and the residue was distilled in vacuo.

Yield 76 gs. (98%), boiling point 107° C. to 109° C./3.5 mms. Equivalent weight 195 (calculated 195). The hydrochloric acid salt was produced from the dihydro-α-ionyl amine by introducing hydrochloric acid gas into a solution of the amine in diethyl ether. The substance was recrystallized from methyl-ethyl ketone. It was found that the hydrochloric acid salt consisted of two diastereo-isomers, having melting points of 194° C. to 196° C. and 157° C. to 158° C.

*Example 2*

TETRAHYDRO-ψ-IONYL AMINE

*1,5,9-trimethyldecene-8-yl amine (Formula II, method II).*—19.6 gs. of tetrahydro-ψ-ionone (0.1 ol) was hydrogenized with 16 mls. of concentrated ammonia (0.2 mol) by means of Raney nickel in ethanol at room temperature under normal pressure. The absorption of hydrogen was 2280 mls. (this is the quantity theoretically required). The reaction mixture was sucked off, the alcohol was evaporated and the residue was dissolved in 200 mls. of 2 n hydrochloric acid. This solution was washed twice with 50 mls. of petroleum ether (boiling point 60 to 80° C.). The aqueous layer was rendered alkaline by means of 50% aqueous caustic soda lye and shaken three times with 100 mls. of petroleum ether. The latter combined petroleum ether extracts were dried on sodium sulphate, the petroleum ether was then evaporated and the residue was distilled in vacuo. The boiling point was 110 to 113° C./1 mm. Yield 14 gs. (71%). This product was further purified by dissolving it in 50 mls. of 2 n hydrochloric acid, 150 mls. of water and 85 mls. of ethanol. This solution was washed five times with 75 mls. of petroleum ether. The aqueous layer was rendered alkaline by means of 50% caustic soda lye, extracted by means of petroleum ether and dried on sodium sulphate. After evaporating the petroleum ether the product obtained had an equivalent weight of 201 (for tetrahydro-ψ-ionyl amine the theoretical equivalent weight is 197).

*Example 3*

β-IONYL AMINE

*1-methyl-3-(2',6',6'-trimethyl-cyclohexene-1'-yl) propene-2-yl amine (Formula III, method IV).*—11.5 gs. (0.3 mol) of lithium-aluminium hydride was suspended in 300 mls. of dry di-ethyl ether. Thereto was added at −30° C. 30 gs. (0.145 mol) of β-iono-oxime in 300 mls. of dioxane. In order to terminate the reaction the ether was distilled off and the residue was kept at 60° C. for 7 hours. The reaction complex was decomposed by water. The amine was separated out via the hydrochloride from the non-alkaline substances and dissolved as such in water. The aqueous layer was then rendered alkaline and extracted by means of ether. The etheric solution thus obtained was dried on solid potassium hydroxide, then filtered, the ether was evaporated and the residue distilled in vacuo. The fraction having a boiling point of 112 to 120° C./5 mms. was collected. Yield 9.5 gs. (34%). Equivalent weight 218 (calculated 193). After redistillation a product was obtained having a boiling point of 112 to 114° C./5 mms. Equivalent weight 209 (calculated 193).

*Example 4*

TETRAHYDRO-IONYL AMINE

*1-methyl-3-(2',2',6'-trimethyl-cyclohexyl) propyl amine (Formula IV, method IV).*—(a) 10 gs. of dihydro-β-ionyl amine, dissolved in 50 mls. of absolute ethanol was added to a prehydrogenized suspension of 100 mgs. of platinum oxide in 50 mls. of absolute ethanol+5 mls. of concentrated hydrochloric acid. 1180 mls. of hydrogen was absorbed. After filtration of the reaction mixture and evaporation of the alcohol, the residue was dissolved in 100 mls. of water. The aqueous solution was rendered alkaline with 10 mls. of 50% caustic soda lye and extracted three times with 100 mls. of di-ethyl ether. After drying off the etheric solution on sodium sulphate, the solution was filtered, the ether was evaporated and the residue was distilled in vacuo. The yield was 8.5 gs. (84%). Boiling point 92 to 93° C/1.2 mms. Equivalent weight 200 (calculated 197).

*Production of the hydrochloride.*—Through a solution of tetrahydro-ionyl amine in di-ethyl ether was led hydrochloric acid gas to obtain an acidic reaction. The precipitate was sucked off and recrystalled from methyl-ethyl ketone and then from ethyl acetate. Melting point 219 to 219.5° C.

*Production of the picrate.*—By means of picric acid the picrate of tetrahydroionyl amine may be obtained, which can be recrystallized from a mixture of equal parts of ethanol and water. Melting point 175 to 176° C.

(b) 4 gs. of dihydro-α-ionyl amine was hydrogenized in the same manner as described above for dihydro-β-ionyl amine. The hydrochloric acid salt was directly separated out and recrystallized from methyl-ethyl ketone and ethyl-acetate. The tetrahydro-ionyl amine-hydrochloride thus obtained had a melting point of 194 to 195° C. and was, apparently, an isomer differing from that obtained under (a).

*Production of the picrate.*—The picrate yielded, after recrystallisation from a mixture of equal quantities of ethanol and water, a substance having a melting point of 169 to 170° C.

B. SECONDARY AMINES

*Example 5*

N-METHYL-TETRAHYDRO-β-IONYL AMINE

*N-1-dimethyl-3-(2',2',6'- - trimethyl-cyclohexyl) propyl amine (Formula V, method I)*—.(a) *N-methyl-N-formyl-tetrahydro-β-ionyl amine N-methyl-N{1 - methyl -3-(2',2',6"- trimethyl-cyclohexyl) propyl}formamide.*—To 18 gs. of aqueous 36% methyl-amine solution (0.21 mol) was added slowly, whilst cooling, 44 gs. of aqueous 85% formic acid solution (0.81 mol). Thereto was added 10 gs. of tetrahydro-β-ionone (0.05 mol). The mixture was distilled with the aid of a fractionating column in a manner such that after 11 hours about 44 gs. had been distilled over. To the distillation residue was added 25 mls. of water and this mixture was extracted with petroleum ether. The solution was washed with an aqueous sodium bicarbonate solution and dried on sodium sulphate. After evaporation of the solvent, the residue was fractionated. The yield was 8.3 gs. (77%). Boiling point 173 to 176° C/2 mms.

(b) *N-methyl-tetrahydro-β-ionyl amine.*—To 5.2 gs. of N-methyl-N-formyl-tetrahydro-β-ionyl amine (0.022 mol) was added 15 mls. of concentrated hydrochloric acid (specific weight 1.19) and 15 mls. of water. This mixture was boiled for 50 minutes and then diluted with 40 mls. of water. After the addition of 25 mls. of ethanol the alcoholic aqueous layer was extracted three times with petroleum ether, then rendered alkaline with 18 mls. of 50% caustic soda and the oil separated out was absorbed in 15 mls. of petroleum ether. This solution was dried on solid sodium hydroxide, evaporated to dryness and the residue (3 gs.) was fractionated. Yield 2 gs. (43%).

Boiling point 126 to 127° C./10 mms. Equivalent weight 211 (calculated 211).

*Example 6*

N-METHYL-α-IONYL AMINE

*N-1-dimethyl-3-(2',6',6'-trimethyl - cyclohexene-2' - yl) propene-2-yl amine (Formula VI, method I)*—(a) *N-formyl-N-methyl-α-ionyl amine.*—Whilst cooling satisfactorily 180 gs. of an aqueous 35% methyl-amine solution was added to 440 gs. of 85% formic acid, to which was then added 110 gs. of α-ionone. This mixture was boiled, whilst water was at the same time slowly distilled off. After 7½ hours of boiling the residue was diluted with 400 mls. of water and extracted with petroleum ether. The united extracts were washed with 200 mls. of 5% aqueous sodium bicarbonate solution and water, then dried on sodium sulphate, evaporated to dryness and the residue subjected to fractionating distillation in vacuo.

The yield was 21 gs. Boiling point: 164 to 174° C./4 mms. N-content found: 5.5 and 5.6% (calculated 5.96%).

(b) *N-methyl-α-ionyl amine.*—10 gs. of N-formyl-N-methyl-α-ionyl amine was boiled with a mixture of 30 mls. of concentrated hydrochloric acid and 30 mls. of water for two hours. After dilution with about 80 mls. of 40% ethanol, the reaction mixture was extracted three times with petroleum ether. Then whilst cooled the reaction mixture had added to it 36 gs. of 50% caustic soda and the alkaline liquid was again extracted with petroleum ether. This extract was dried on sodium sulphate, the solvent was evaporated at room temperature in vacuo and the residue was distilled in vacuo.

The yield was 1.3 gs. (15%). Boiling point 95 to 103° C./2.4 mms. Equivalent weight 204 (calculated 207).

*Example 7*

N-METHYL-β-IONYL AMINE

*N-1-dimethyl-3-(2',6',6'-trimethyl-cyclohexene-1' - yl) propene-2-yl amine (Formula VII, method I)*—(a) *N-formyl-N-methyl- -ionyl amine.*—To 36 gs. of an aqueous 36% methyl amine solution (0.42 mol) was added, whilst cooling, by water, slowly 88 gs. of 85% aqueous formic acid (1.64 mols) and then 19.2 gs. of (0.1 mol) of β-ionone. The mixture was subjected to fractionating distillation in a manner such that within about 7 hours 80 mls. was distilled over. Carbon dioxide was then developed. The distillation residue was diluted with 75 mls. of water and extracted four times with 30 mls. of petroleum ether. The united extracts were washed twice with 30 mls. of a 5% aqueous sodium bicarbonate solution and then twice with 30 mls. of water. The solution was dried on sodium sulphate, then filtered, the petroleum ether was evaporated and the residue was distilled in vacuo. Yield 7.7 gs. Boiling point 161 to 163° C./1.2 mms.

(b) *N-methyl-β-ionyl amine.*—7.7 gs. of N-formyl-N-methyl-β-ionyl amine was boiled with a mixture of 24 mls. of concentrated hydrochloric acid (S.W.=1.19) and 24 mls. of water for two hours. After cooling the reaction mixture was diluted with 40 mls. of water and 40 mls. of ethanol. The mixture was then washed three times with 30 mls. of petroleum ether. The solution was then rendered alkaline by means of 35 mls. of 50% aqueous caustic soda, then extracted three times by means of 35 mls. of petroleum ether, after which the united extracts were dried on sodium sulphate, filtered, the solvent evaporated and the residue distilled in vacuo.

Yield 1 g. Boiling point 112 to 130° C./8 to 9 mms. Equivalent weight 205 (calculated 207).

*Example 8a*

N-METHYL-DIHYDRO-$\beta$-IONYL AMINE

N-1-dimethyl-3-(2',6',6'-trimethyl-cyclohexene-1' - yl) propyl amine (Formula VIII, method II).—To 36.4 gs. of $\beta$-ionone (0.19 mol), dissolved in 150 mls. of absolute ethanol was added a suspension of Raney nickel (obtained by activating 10 gs. of alloy with 50% caustic soda, followed by washing with water) in 40 mls. of absolute ethanol. To this mixture was added 35 gs. of an aqueous 35% methyl-amine solution (0.41 mol). The hydrogenation took place under 1.1 atmospheres of pressure and at room temperature.

When the absorption of hydrogen was 9200 mls. (=2 mols of hydrogen per molecule) the solution was sucked off and the filtrate was evaporated to dryness in vacuo. The residue was dissolved in 300 mls. of hydrochloric acid and this solution was washed three times with di-ethyl ether. The aqueous solution was rendered alkaline with 25 mls. of 50% caustic soda and the oil layer separating out was absorbed in di-ethyl ether and then the aqueous layer was shaken twice with di-ethyl ether. The latter combined etheric extracts were dried on sodium sulphate, the ether was evaporated and the residue was distilled in vacuo. The yield was 20.2 gs. (51%). Boiling point 131 to 134° C./10 mms. Equivalent weight 213 (theoretical value 209).

*Example 8b*

N-METHYL-DIHYDRO-$\beta$-IONYL AMINE

N-1-dimethyl-3-(2',6',6'-trimethyl-cyclohexene-1' - yl) propyl amine (Formula VIII, method II).—77 gs. of $\beta$-ionone (0.4 mol) and 54 gs. of a 35% aqueous methyl amine solution (0.6 mol) in absolute ethanol were hydrogenized by means of a platinum suspension, produced by hydrogenizing 350 mgs. of platinum oxide in absolute ethanol at normal temperature and pressure. When 14 ls. of hydrogen had been absorbed, again 250 mgs. of hydrogenized platinum oxide was added, since under the said conditions the hydrogenation takes place slowly. In total 18.5 ls of hydrogen was absorbed (=2 mols hydrogen/mol). The solution was sucked off and the alcohol was evaporated in vacuo. The residue was converted with concentrated hydrochloric acid (S.W. 1.19) into the corresponding salt and this was dissolved in 50% aqueous alcohol. This solution was extracted twice with petroleum ether (60 to 80° C.). The major portion of the alcohol of the alcoholic, aqueous layer was evaporated in vacuo; the remaining layer was rendered alkaline with 50% caustic soda and extracted three times with di-ethyl ether. The total etheric extracts were dried on sodium sulphate. The ether was evaporated and the residue was distilled in vacuo.

The yield was 75 gs. (92%). Boiling point 112 to 115° C./1.5 mms. Equivalent weight 209 (calculated 209).

*Example 9*

N-ISOAMYL-DIHYDRO-$\beta$-IONYL AMINE 3-methyl-N-{1-methyl-3-(2',6',6'-trimethyl - cyclohexene-1'-yl) propyl}butyl amine (Formula IX, method II). —6 gs. (0.05 mol) of the hydrochloric acid salt of isoamyl amine was converted into the base and added as such to a solution of 8.5 gs. of $\beta$-ionone (0.44 mol) in 20 mls. of absolute ethanol. This solution was added to a suspension of 200 mgs. of platinum catalyst in 40 mls. of ethanol and hydrogenized at room temperature under a pressure of 1.1 atm. When the absorption of hydrogen was 2230 mls. (calculated for 2 mols. of hydrogen/mol, 2024 mls.) the solution was sucked off the alcohol was evaporated in vacuo and the residue was dissolved in a mixture of 25 mls. of 2 n hydrochloric acid, 25 mls. of water and 25 mls. of ethanol. This solution was extracted three times with 50 mls. of petroleum ether and the aqueous layer was rendered alkaline with 5 mls. of 50% caustic soda and extracted three times with petroleum ether. The total extracts mentioned last were dried on solid sodium hydroxide, the petroleum ether was distilled off and the residue was distilled in vacuo.

The yield was 8.7 gs. (75%). Boiling points 164 to 176° C./10 mms. Equivalent weight 267 (calculated 265).

*Example 10*

N-SEC. BUTYL-DIHYDRO-$\beta$-IONYL AMINE 1,1' - dimethyl-3-(2'',6'',6''-trimethyl-cyclo hexene-1''-yl) dipropyl-amine (Formula X, method II).—200 mgs. of platinum oxide was prehydrogenized in 25 mls. of absolute ethanol. To this suspension was added 9.75 gs. of dihydro-$\beta$-ionyl amine (0.05 mol) and a solution of 3.8 gs. of methyl-ethyl ketone (0.053 mol) in 25 mls. of absolute ethanol. The mixture was hydrogenized with hydrogen at normal temperature, under normal pressure. When 1210 mls. of hydrogen had been absorbed (theoretically required quantity for 1 mol is 1150 mls.), the hydrogenizing solution was sucked off, the alcohol was evaporated and the residue was distilled in vacuo.

The yield was 10 gs. (80%). Boiling point 122 to 124° C./3.0 mms. Equivalent weight 245 (calculated 251).

*Example 11*

N-(2-PHENYL-ETHYL)-DIHYDRO-$\beta$-IONYL AMINE 1-methyl - 3 - (2',6',6'-trimethyl-cyclohexene-1'-yl)-N-(2 - phenyl - ethyl)propyl amine (Formula XI, method II).—200 mgs. of platinum oxide was prehydrogenized in 25 mls. of ethanol and to this suspension was added 19.2 gs. of $\beta$-ionone (0.1 mol), dissolved in 50 mls. of absolute ethanol and 13.9 gs. of 2-phenyl-ethyl amine (0.115 mol), dissolved in 25 mls. of absolute ethanol.

The hydrogenation was performed at normal temperature under normal pressure. During the hydrogenation twice a new catalyst was added to the reaction mixture, owing to the slow performance of the hydrogenation. When 4100 mls. of hydrogen had been absorbed (for 2 mols of hydrogen/mol the required quantity is 4600 mls.) the mixture was filtered and to the filtrate was added 150 mls. of petroleum ether and then 100 mls. of 2 n hydrochloric acid. The aqueous, alcoholic layer was separated out, it was shaken twice with 150 mls. of petroleum ether and then rendered alkaline with 20 mls. of 50% caustic soda. The separated layer containing amine was extracted with petroleum ether, the extracts thus obtained were first dried on sodium sulphate and then on sodium hydroxide, after which the petroleum ether was distilled off and the residue subjected to distillation in vacuo.

The yield was 23.2 gs. (78%). Boiling point 184 to 186° C./3 mms. Equivalent weight 297 (calculated 299).

*Example 12*

N-ISOPROPYL-DIHYDRO-$\beta$-IONYL AMINE

N - isopropyl - 1 - methyl-3 - (2',2',6'-trimethyl-cyclohexene-1'-yl) propyl amine (Formula XII, method II).— This compound was produced by reducing $\beta$-ionone in the presence of isopropyl amine with hydrogen and platinum by the method as described in one of the Examples VIII to XI. Yield: 72%, boiling point 138 to 139° C./9 mms. Equivalent weight 236 (calculated 237).

Example 13

N-n-BUTYL-DIHYDRO-β-IONYL AMINE

N-{1-methyl - 3 - (2',6',6'-trimethyl-cyclohexene-1'-yl) propyl}-butyl amine (Formula XIII, method II).—This compound was produced in the same manner as the compound VIII–IX from β-ionone and butyl amine by reduction by means of hydrogen and platinum. Yield 95%, boiling point 160 to 161° C./10 mms. Equivalent weight 253 (calculated 251).

Example 14

N-CYCLOHEXYL-DIHYDRO-β-IONYL AMINE

N-cyclohexyl - 1 - methyl - 3-(2',6',6'-trimethyl-cyclohexene-1'-yl) propyl amine (Formula XIV, method II).— This compound was produced by the reduction of β-ionone by means of a platinum catalyst and hydrogen in the presence of cyclohexyl amine in the manner described for the compounds VIII–IX. Yield 65%, boiling point 150 to 151° C./2 mms. Equivalent weight 280 (calculated 277).

Example 15

N-(3,5,5-TRIMETHYL-CYCLOHEXYL-DIHYDRO-β-IONYL AMINE

N-{1-methyl - 3 - (2',6',6'-trimethyl-cyclohexene-1'-yl) propyl}-3",3",5" - trimethyl-cyclohexyl amine (Formula XV, method II).—The compound was produced by the reduction of dihydro-β-ionyl amine with hydrogen and a platinum catalyst in the presence of isophorone in the manner described for the production of the compounds VIII–IX. Yield 45%, boiling point 177 to 178° C./2 mms. Equivalent weight 319 (calculated 319).

Example 16

BIS-(DIHYDRO-β-IONYL) AMINE

Bis-{1-methyl - 3 - (2',6',6'-trimethylcyclohexene-1'-yl) propyl} amine (Formula XVI, method II).—The compound was produced by the reduction of β-ionone with hydrogen and platinum in the presence of dihydro-β-ionyl amine. Yield 51%, boiling point 224 to 226° C./1 mm. Equivalent weight 373 (calculated 373).

Example 17

N-PHENYL-ISOPROPYL-DIHYDRO-β-IONYL AMINE

N-(1-methyl - 2 - phenyl-ethyl)-1-methyl-3-(2',6',6'-trimethyl-cyclo-hexene-1'-yl) propylamine (Formula XVII, method II).—The compound was produced by the reduction of β-ionone by means of hydrogen and a platinum catalyst in the presence of phenyl-isopropyl amine, in the manner described for the production of the compounds VIII–IX.

Yield 62%, boiling point 174 to 175° C./1.3 mms. Equivalent weight 312 (calculated 313).

Example 18

N-(FURFURYL)-DIHYDRO-β-IONYL AMINE

N - (2' - furfuryl - methyl) - 1 - methyl - 3-(2',6',6'-trimethyl-cyclohexane)-1'-yl) propyl amine (Formula XVIII, method II).—The compound was produced by the reduction of dihydro-β-ionyl amine with the aid of hydrogen and a platinum catalyst in the presence of furfural in the manner described for the production of the compound X. Yield 75%, boiling point 158 to 161° C./1.8 mms. Equivalent weight 273 (calculated 275).

Example 19

N-(p-METHOXY-PHENYL SEC. BUTYL)-DIHYDRO-β-IONYL AMINE 1,1' - dimethyl - 3 - (2",6",6" - trimethylcyclohexene - 1"-yl)-3'-(p-methoxy-phenyl) dipropyl amine (Formula XIX, method II.)—The compound was produced by the reduction of dihydro-β-ionyl amine with the aid of hydrogen and a platinum catalyst in the presence of anisal acetone.

Yield 40%, boiling point 218 to 220° C./0.5 mm. Equivalent weight 346 (calculated 357).

Example 20

N-(2-HYDROXY-ETHYL) DIHYDRO-β-IONYL AMINE

N - (2 - hydroxy - ethyl) - 1 - methyl - 3 - (2',6',6' - trimethylcyclohexene-1'-yl) propyl amine (Formula XX, method II).—The compound was produced by reducing β-ionone in the presence of ethanol amine with the aid of hydrogen and a platinum catalyst in the manner described for the production of the compounds VIII–IX. The yield was 50%. Boiling point 174 to 175° C./15 mms. Equivalent weight 237 (calculated 239).

Example 21

N-METHYL-DIHYDRO-α-IONYL AMINE

N - 1 - dimethyl - 3-(2',6',6' - trimethyl - cyclohexene - 2' - yl) propyl amine (Formula XXI, method II).—240 mgs. of platinum oxide was hydrogenized in 100 mls. of alcohol and to this suspension was then added 19.2 gs. of α-ionone and 32 gs. of 36% methyl amine solution, diluted with 100 mls. of alcohol. This liquid was hydrogenized until it had absorbed 2 mols of hydrogen. Then the mixture was filtered and after the addition of 200 mls. of 2 n hydrochloric acid it was shaken three times with petroleum ether, after which the water layer was rendered alkaline. The amine thus separated out was dissolved in petroleum ether, the solution was dried on solid potassium hydroxide, filtered and after the evaporation of the solvent it was distilled in vacuo. Yield 17 gs. (81%), boiling point 142 to 146° C./23 mms. Equivalent weight found 210 (calculated 209).

Example 22

N-(p-METHOXY-PHENYL-SEC. BUTYL) TETRAHYDRO-β-IONYL AMINE 1,1' - dimethyl - 3 - (2",2",6" - trimethyl - cyclohexyl)-3'-(p-methoxy - phenyl) dipropyl amine (Formula XXII, method II).—To 300 mgs. of prehydrogenized platinum oxide suspended in absolute ethanol was added 39 gs. of dihydro-β-ionyl amine (0.2 mol) and 35 gs. of anisal acetone (0.2 mol), dissolved in 350 mls. of absolute ethanol. The hydrogenation by means of hydrogen was performed at normal temperature under atmospheric pressure. The absorption of hydrogen was 14.5 ls. (theoretically required quantity for 3 mols hydrogen/mol is 13.8 ls.). The solution was filtered and the alcohol was evaporated for the major part. To the residue was added about 500 mls. of water. An oil layer rose to the surface, this layer was dissolved in diethyl ether and separated out. The aqueous layer was extracted again twice with di-ethyl ether, after which the extracts were collected and dried on sodium sulphate. The ether was evaporated and the residue was distilled in vacuo. The yield was 39 gs. Boiling point 220 to 223° C./0.5 mm. Equivalent weight 362 (calculated 359).

N-(3-(p-HYDROXYPHENYL) SEC. BUTYL) TETRAHYDRO-β-IONYL AMINE 1,1' - dimethyl - 3 - (2',2',6' - trimethylcyclohexyl) - 3' - (p-hydroxyphenyl) dipropyl amine.—12.5 gs. of N-(3-(p-methoxyphenyl) sec. butyl) tetrahydro-β-ionyl amine was boiled for eight hours with 50 mls. of 48% bromine hydrogen acid and the warm floating oil was then poured out on a Petri dish. The hardened crystals formed were separated out after some time, pulverized and washed with water.

Example 23

N-FURFURYL-DIHYDRO-α-IONYL AMINE

N - (2 - furfurylmethyl) - 1 - methyl - 3 - (2',6',6' - trimethylcyclohexene)-2'-yl) propyl amine (Formula XXIII, method II).—A solution of 10 gs. of dihydro-α-ionyl amine (0.05 mol) and 5 gs. of furfural (0.05 mol) in 200 mls. of absolute ethanol was hydrogenized by means of a platinum catalyst at normal temperature under normal pressure. The hydrogenation was stopped after 1150 mls. had been absorbed (theoretically required quantity for the absorption of 1 mol is 1150 mls.). The solution was filtered and then the filtrate had added to it 50 mls. of 2 n hydrochloric acid and 250 mls. of water. This solution was washed twice with 50 mls. of petroleum ether, then rendered alkaline by means of 50% caustic soda and shaken once with 100 mls. and then twice with 75 mls. of petroleum ether. The latter extracts were collected and dried on sodium sulphate. After the evaporation of the petroleum ether the residue (12 gs.) was subjected to vacuum distillation.

The yield was 10.5 gs. (76%), boiling point 116 to 118° C./0.02 mm. Equivalent weight 278 (calculated 275).

Example 24

N-ISOAMYL-TETRAHYDRO-ψ-IONYL AMINE

N-(3-methylbutyl)-1,5,9-trimethyldecene-8-yl amine (Formula XXIV, method II).—19.2 gs. of ψ-ionone (0.10 mol) and 8.7 gs. of iso-amyl amine (0.10 mol) dissolved in 200 mls. of absolute ethanol was hydrogenized by means of hydrogen and a platinum catalyst at normal temperature under normal pressure. When 6800 mls. of hydrogen had been absorbed (required quantity for 3 mols is 6900 mls.) the hydrogenation was stopped, the solution was sucked off and the filtrate was evaporated to 100 mls. To the residue was added 100 mls. of 2 n hydrochloric acid and 100 mls. of water. The aqueous alcoholic layer was shaken three times with 100 mls. of petroleum ether and then rendered alkaline by means of 50% caustic soda. Then again petroleum ether was used for extraction.

The latter extracts together were dried on sodium sulphate, after which the solvent was evaporated and the residue (21 gs.) distilled in vacuo.

The yield was 19 gs. (71%). Boiling point 141 to 144° C./1 mm. Equivalent weight 263 (calculated 267).

Example 25

N-ISOAMYL-HEXAHYDRO-ψ-IONYL AMINE

N-(3-methylbutyl)-1,5,9-trimethyldecyl amine (Formula XXV, method II).—10 gs. (0.051 mol) of tetrahydro-ψ-ionone, dissolved in 40 mls. of absolute ethanol was added to 4.3 gs. (0.05 mol) of isoamyl amine, dissolved in 70 mls. of absolute ethanol. The hydrogenation by means of hydrogen and a platinum catalyst was performed at normal temperature under atmospheric pressure. When the absorption of hydrogen was 2290 mls. (calculated for 2 mol hydrogen/mol this must be 2300 mls.) the reaction mixture was filtered and the filtrate was acidified with 35 mls. of 2 n hydrochloric acid. The solution was evaporated to dryness and the residue was dissolved in a mixture of 250 mls. of water and 150 mls. of ethanol. The aqueous, alcoholic solution was washed once with 150 mls. of petroleum ether and then rendered alkaline by means of 50% caustic soda. The oil layer produced was separated out and the remainder was extracted twice by means of 100 mls. of di-ethyl ether. The oil layer and the etheric extracts together were dried on sodium sulphate, the ether was distilled off and the residue was distilled in vacuo.

The yield was 7 gs. (53%). Boiling point 140° C./0.5 mm. Equivalent weight 263 (calculated 269).

Example 26

N-METHYL-TETRAHYDRO-ψ-IONYL AMINE

N - 1,5,9 - tetramethyldecene - 8 - yl amine (Formula XXVI, method II).—96 gs. of ψ-ionone (0.5 mol) in 150 mls. of absolute ethanol was hydrogenized by means of hydrogen and a platinum catalyst at normal temperature under atmospheric pressure to obtain tetrahydro-ψ-ionone. When 23 ls. of hydrogen had been absorbed, 69 gs. of 35% methyl amine solution (0.75 mol) and 300 mls. of absolute ethanol was added and the hydrogenation was continued. When the absorption of hydrogen was 11.25 ls. (theoretically required quantity is 11.50 ls.), the solution was filtered and the alcohol was evaporated for the major part in vacuo. To the residue was added 300 mls. of 2 n hydrochloric acid. The solution obtained was shaken twice with 100 mls. of petroleum ether; the aqueous layer was rendered alkaline by means of 50% caustic soda and extracted again with petroleum ether. The latter extracts together were dried on sodium sulphate, after which the solvent was evaporated and the residue was distilled in vacuo. The yield was 96 gs. (91%). Boiling point 116 to 120° C./1 mm. Equivalent weight 218 (calculated 211).

Example 27

N-ISOPROPYL-TETRAHYDRO-ψ-IONYL AMINE

N-isopropyl-1,5,9-trimethyldecene-8-yl amine (Formula XXVII, method II).—A mixture of 19.6 gs. of tetrahydro-ψionone (0.1 mol) and 6 gs. of isopropyl amine (0.1 mol), dissolved in 200 mls. of absolute ethanol, was hydrogenized at normal temperature under atmospheric pressure by means of a platinum catalyst. When 2310 mls. of hydrogen had been absorbed (theoretically required quantity was 2300 mls.) the hydrogenation was interrupted, the solution was filtered and evaporated in vacuo to 60 mls. To the residue was added 100 mls. of 2 n hydrochloric acid and 40 mls. of water. This solution was extracted with petroleum ether. The alcoholic, aqueous layer was then rendered alkaline by means of 50% caustic soda and again extracted with petroleum ether. The latter extracts together were dried on sodium sulphate and after filtering and evaporating the petroleum ether, the residue was distilled in vacuo.

The yield was 18 gs. (75%), boiling point 122 to 124° C./1.5 mms. Equivalent weight 243 (calculated 239).

Example 28

N-METHYL-DIHYDRO-ψ-IONYL AMINE

N-1,5,9-tetramethyldecadiene-4,8-yl amine (Formula XXVIII, method II).—A mixture of 30 gs. of ψ-ionone (0.15 mol) and 21 gs. of 35% methyl amine solution (0.23 mol), dissolved in 150 mls. of absolute ethanol, was hydrogenized by means of hydrogen and a platinum catalyst at room temperature under normal pressure. When 7 ls. of hydrogen had been absorbed (theoretically required quantity was 6.9 ls.), the hydrogenation was stopped and the solution was filtered. To the filtrate was added 25 mls. of concentrated hydrochloric acid (S.W. 1.19) and 225 mls. of water. This solution was shaken a few times with petroleum ether. The alcoholic, aqueous layer was rendered alkaline by means of 50 mls. of 50% caustic soda and extracted a few times with petroleum ether. The latter extracts together were dried on sodium sulphate filtered, the petroleum ether was evaporated and the residue was distilled in vacuo. The yield was 15 gs. (50%), boiling point 114 to 122° C./1 mm. Equivalent weight 210 (calculated 209).

Example 29

N-PHENYL-ISOPROPYL-DIHYDRO-α-IONYL AMINE

N(1'methyl-2'-phenylethyl)-1-methyl-3 - (2',6',6' - trimethyl-cyclohexene-2'-yl)propyl amine (Formula XXIX, method II).—The compound was produced by hydrogenizing α-ionone under the action of a platinum catalyst Yield 85%, melting point 84 to 87° C. Bromine content found 19.3% (calculated 18.8%).

in the presence of phenylisopropyl amine. The yield was 68% of the theoretically possible yield. Boiling point 180 to 182° C./25 mms. Equivalent weight 313 (calculated 313).

Example 30
N-(1,3-DIMETHYLBUTYL)-DIHYDRO-β-IONYL AMINE

*1,3-dimethyl-N-(1-methyl-3-(2',6',6' - trimethyl - cyclohexene-1'-yl)propyl) butyl amine (Formula XXX, method II).*—The compound is obtained by hydrogenizing β-ionone by means of a platinum catalyst in the presence of an equimolar quantity of 1,3-dimethyl-butyl amine. The yield was 50% of the theoretically obtainable yield. Boiling point 174 to 175° C./15 mms. Equivalent weight 237 (calculated 239).

Example 31
N-SEC. BUTYL-TETRAHYDRO-β-IONYL AMINE

*1,1'-dimethyl-3 - (2',2',6' - trimethyl-cyclohexyl) - dipropyl amine (Formula XXXI, method II).*—500 mgs. of platinum oxide was hydrogenized in 25 mls. of absolute alcohol and to this suspension was added a solution of 5 gs. of N-sec. butyl-dihydro-β-ionyl amine (0.02 mol) in 25 mls. of absolute alcohol and 2 mls. of concentrated hydrochloric acid. The mixture was hydrogenized at room temperature under atmospheric pressure. When 380 mls. of hydrogen had been absorbed, again a hydrogenized suspension of 200 mgs. of platinum oxide in 25 mls. of ethanol was added, and hydrogenation was continued. When the theoretically required quantity of hydrogen (460 mls.) had been absorbed, the mixture was filtered and the alcohol evaporated. The residue was formed by a tough oil, which crystalled out after having been dried. Yield was quantitative. Melting point 92 to 96° C. After recrystallisation from methyl-ethyl ketone the melting point was 130 to 132° C.

*Analysis.*—Found: C, 69.73%; H, 12.32%; N, 4.91%; Cl, 12.45%. Calculated: C, 70.47%; H, 12.43%; N, 4.84%; Cl, 12.25%.

Example 32
N-ETHYL-TETRAHYDRO-ψ-IONYL AMINE

*N-ethyl-1,5,9-trimethyldecene - 8 - yl amine (Formula XXXII, method II).*—First ψ-ionone was hydrogenized by means of a platinum catalyst to obtain tetrahydro-ψ-ionone and then in the presence of ethyl amine the reduction was continued.

The yield of the aforesaid product was 87% of the theoretically expected quantity. Equivalent weight 230 (calculated 225).

Example 33
N-(PHENYL-ISOPROPYL) TETRAHYDRO-ψ-IONYL AMINE

*N-(1'-methyl-2'-phenylethyl)-1,5,9-trimethyldecene - 8-yl amine (Formula XXXIII, method II).*—The compound was produced by the reduction of ψ-ionone by means of hydrogen, and platinum catalyst to obtain tetrahydro-ψ-ionone and by continuing the reduction in the presence of phenyl-isopropyl amine. Yield 55%. Boiling point 196° C./1 mm. Equivalent weight 316 (calculated 315).

Example 34
N-METHYLHEXAHYDRO-ψ-IONYL AMMONIUM CHLORIDE

*N-1,5,9-tetramethyldecyl - ammonium chloride (Formula XXXIV, method II).*—The compound was produced by the reduction of the corresponding tetrahydro-compound by means of a platinum catalyst and hydrogen in an acidic milieu. Yield was quantitative. Chlorine content was 13.9% (calculated 14.2%).

Example 35
N-(PHENYL-ISOPROPYL) HEXAHYDRO-ψ-IONYL AMINE

*1,5,9-trimethyl-N-(1'-methyl - 2' - phenylethyl)decyl amine (Formula XXXV, method II).*—The compound was produced by reducing tetrahydro-ψ-ionone by means of hydrogen and a platinum catalyst in the presence of phenyl-isopropyl amine.

The yield was 57% of the theoretically possible value. Boiling point 186° C./0.8 mm. Equivalent weight 319 (calculated 317).

Example 36
N-(2-PYRIDYL)TETRAHYDRO-β-IONYL AMINE

*N-(2'-pyridyl)-1-methyl-3 - (2',2',6' - trimethylcyclohexyl)-propyl amine (Formula XXXVI, method III)*—
(a) *Tetrahydro-β-ionone.*—β-ionone was hydrogenized by means of hydrogen and a platinum catalyst to obtain tetrahydro-β-ionone. This ketone was boiled with lithium-aluminium hydride (1.2 mols/1 mol ketone) for one hour whilst stirred in absolute di-ethyl ether. The complex produced was decomposed by means of water. After having sucked off the reaction mixture, the filtrate was dried on sodium sulphate, filtered and evaporated to dryness. The residue was distilled in vacuo. The yield was 90% of the theoretically obtainable value. Boiling point 116 to 117° C./3.5 mms. $N_D^{22}=1.4759$.

(b) *Tetrahydro-β-ionyl bromide.*—Through tetrahydro-β-ionol was led for five hours at a temperature between 120 and 130° C. dry hydrogen bromide gas. The reaction mixture was then dissolved in petroleum ether and washed with concentrated hydrochloric acid and then with water. The washed solution was dried on sodium sulphate, filtered, evaporated to dryness and the residue was distilled in vacuo. The yield was 65%. Boiling point 135 to 138° C./7 mms. $N_D^{22}=1.4900$. Bromine content found 30.40% (calculated 30.65%).

(c) *N-(2-pyridyl)tetrahydro-β-ionyl amine.*—0.22 mol (5 gs.) of lithium amide and 0.22 mol (20 gs.) of 2-amino-pyridine were boiled for six hours in 50 mls. of dry toluene, whilst stirred. Then the mixture had added to it 26 gs. (0.1 mol) of tetra-hydro-β-ionyl bromide and 50 mls. of dry toluene. Then the mixture was heated for 40 hours, whilst stirred, at 130° C. The reaction mixture was then washed with water and the washed liquid was extracted by means of di-ethyl ether. The etheric extracts were added to the washed reaction mixture and the whole was dried on sodium sulphate. The solvent was evaporated and the residue was distilled in vacuo. The yield was 3.8 gs. (14%), boiling point 132 to 134° C./0.03 mm. Equivalent weight 273 (calculated 274).

Example 37
N-(2-PYRIDYL)-DIHYDRO-β-IONYL AMINE

*1 - methyl - N - (2'-pyridyl)-3-(2',6',6'-trimethyl-cyclohexene-1'-yl) propyl amine (Formula XXXVII, method III).*—60 gs. of dihydro-β-ionyl amine (0.3 mol) was boiled in 250 mls. of dry toluene with 8 gs. of lithium amide (0.345 mol) for 50 hours, whilst stirred. Then 24 gs. of 2-brom-pyridine (0.15 mol) was added to the reaction mixture and the mixture was boiled again for 45 hours, whilst stirred. The reaction mixture was then washed three times with 100 mls. of water, the solution obtained was dried on sodium sulphate, the toluene was distilled off and the residue was fractionated in vacuo. The yield was 8 gs. (i.e. 20% of the theoretically obtainable yield).

Boiling point 180° C./0.5 mm. Equivalent weight 285 (calculated 275).

Example 38
N-ISOAMYL-DIHYDRO-α-IONYL AMINE

*3 - methyl - N - [1-methyl - 3-(2',6',6'-trimethyl-cyclohexene-2'-yl)propyl]butyl amine (Formula XXXVIII, method III).*—9.75 gs. of dihydro-α-ionyl amine (0.05 mol) and 7.5 gs. of iso-amyl bromide (0.05 mol) were boiled in 50 mls. of absolute ethanol, after being kept for one night at room temperature, for one hour. The alcohol was then vaporated in vacuo and to the residue was added 5 mls. of methyl-ethyl ketone. Crystallisation occurred. The precipitate consisting of dihydro-α-ionyl amine-hydrobromide was sucked off. The filtrate was evaporated to dryness and to the residue was added 50% caustic soda. The solution was extracted a few times with di-ethyl-ether, after which the extracts were dried on sodium sulphate, filtered and then evaporated to dryness. The residue was fractionated in vacuo. The yield was 4.5 gs. (34%). Boiling point 130 to 135° C./3.5 mms. Equivalent weight 271 (calculated 265).

Example 39

N-ETHYL-DIHYDRO-β-IONYL AMINE $N$ - ethyl-1-methyl-3-(2',6',6'-trimethyl-cyclohexene-1'-yl)propyl amine (Formula XXXIX, method V)—(a) N - acetyl - dihydro - β - ionyl amine—N-[1-methyl-3-(2',6',6' - trimethyl - cyclohexene - 1' - yl)propyl]acet-amide.—12.5 gs. of dihydro-β-ionyl amine was poured on 42 mls. of acetic acid anhydride. The mixture was then kept at 90° C. for half an hour on a steam bath and finally boiled for five minutes. The reaction mixture was poured out into 450 mls. of water and extracted a few times in succession with diethyl ether. The etheric extracts were then washed with 2 n caustic soda, water, 2 n hydrochloric acid and again water and then dried on sodium sulphate and filtered. The ether was evaporated and the residue was distilled in vacuo. The yield was 12.5 gs. (82%), boiling point 169 to 171° C./2.5 mms.

(b) N-ethyl-dihydro-β-ionyl amine.—9 gs. of N-acetyl-dihydro-β-ionyl amine (0.038 mol) was dissolved in 150 mls. of absolute di-ethyl ether and this solution was dripped into a suspension of 2.5 gs. (0.064 mol) of lithium-aluminum hydride in 100 mls. of absolute di-ethyl ether. During the addition (for one and a half hours) and then again (for three and a half hours) the mixture was boiled and stirred. Then the reaction mixture was decomposed with 200 mls. of water containing di-ethyl ether and then with 15 mls. of water and filtered. The ether of the filtrate was dried on sodium sulphate and evaporated. The residue had a weight of 8.7 gs. and was fractionated. Yield 4.5 gs. (55%) and 2.5 gs. of starting product. Boiling point 115 to 118° C./1 mm. Equivalent weight 230 (calculated 223).

Example 40

1,5 - dimethyl - 7-(2',6',6'-trimethyl - cyclohexene-1'-yl)heptyl amine (Formula XL, method II).—38.7 gs. (0.15 mol) of 6-methyl-8-(2',6',6'-trimethyl-cyclohexene-1'-yl) octatriene-3,5,7-one-2 was dissolved in 300 mls. of absolute ethanol. This solution was added to a pre-hydrogenized suspension of 15 gs. of Raney nickel in 200 mls. of absolute ethanol. Then 24 mls. of concentrated ammonia was added and hydrogenized. When the absorption of hydrogen had been achieved, the reaction mixture was sucked off and the alcohol of the filtrate was evaporated. To this residue was added 50 mls. of 2 n-hydrochloric acid and 200 mls. of 4% aqueous ethanol and this solution was shaken with petroleum ether. Then the aqueous solution was rendered alkaline by means of 50% caustic soda and extracted with di-ethyl ether. The etheric extract was dried on sodium sulphate and evaporated and the residue was distilled in vacuo. The yield was 16.5 gs. Boiling point 146 to 148° C./1 to 1.5 mms. Equivalent weight 281 (calculated 265).

13 gs. of the substance thus obtained was dissolved in 1.5 ls. of 10% aqueous ethanol, after the addition of 2 n-hydrochloric acid to obtain an acidic reaction. This solution was shaken with petroleum ether and then rendered alkaline by means of 50% caustic soda and extracted with di-ethyl ether. The etheric extract was dried on sodium sulphate and the ether was evaporated. The yield was 10 gs. Equivalent weight 268 (calculated 265).

Example 41

$N$ - (3 - methylbutyl) - 1,5 - dimethyl - 7-(2',6',6'-trimethyl-cyclohexene-1'-yl)heptyl amine (Formula XLI, method II).—52 gs. (0.2 mol) of 6-methyl-8,(2',6',6'-trimethyl-cyclohexene-1'-yl) octatriene-3,5,7-one-2 was dissolved in 150 mls. of ethanol and this solution was added to a suspension of 500 mgs. of platinum catalyst in 50 mls. of ethanol. To the suspension was added 20 gs. of isoamyl amine, dissolved in 50 mls. of ethanol and the reaction mixture was hydrogenized. When the hydrogenation had been achieved, the reaction mixture was filtered and the alcohol of the filtrate was evaporated. The residue was subjected to fractionating distillation in vacuo. The yield was 19 gs. (28.5%), boiling point 167 to 171° C./1.1 mms. Equivalent weight 343 (calculated 335).

C. TERTIARY AMINES

Example 42

N,N-DIMETHYL-TETRAHYDRO-ψ-IONYL AMINE $N,N$ - 1,5,9 - pentamethyldecene-8-yl amine (Formula XLII, method V)—(a) N-formyl-N-methyltetrahydro-ψ-ionyl amine.—A mixture of 10.5 gs. (0.05 mol) of N-methyl-tetrahydro-ψ-ionyl amine and 2.5 gs. (0.055 mol) of 100% formic acid were heated at 150° C. for four hours. The mixture was then distilled in vacuo. The yield of formyl compound was 8.8 gs. (76%). Boiling point 120 to 122° C./0.35 mm.

(b) N,N-dimethyl-tetrahydro-ψ-ionyl amine.—8 gs. of N-formyl-N-methyl-tetrahydro-ψ-ionyl amine was dissolved in absolute di-ethyl ether and the solution was added to a suspension of 6 gs. of lithium-aluminium hydried in absolute di-ethyl ether. This mixture was boiled, whilst stirred, for 12 hours. The reaction mixture was decomposed with water and filtered. The etheric filtrate was dried on sodium sulphate, filtered, the ether was evaporated and the residue was distilled in vacuo. Yield: 79%. Boiling point 98 to 100° C./0.7 mm. Equivalent weight 228 (calculated 225).

Example 43

N,N-DIMETHYL-DIHYDRO-β-IONYL AMINE $N,N$ - 1 - trimethyl - 3 - (2',6',6' - trimethyl - cyclohexene-1'-yl)propyl amine (Formula XLIII, method II).—The compound was produced by the reduction of β-ionone with hydrogen and a platinum catalyst in the presence of di-methyl amine. The yield was 8% of the theoretically obtainable value. Boiling point 127 to 128° C./11 mms.

Analysis.—Found: C, 80.55%; N, 80.45%; H, 13.30 and 13.29%; N, 6.16 and 6.17%. Equivalent weight 229. Calculated: C, 80.75%; H, 13.01%; N, 6.28%. Equivalent weight 223.

Example 44

N,N-DIETHYL-DIHYDRO-β-IONYL AMINE $N,N$ - diethyl - 1 - methyl - 3 - (2',6',6' - trimethyl-cyclohexene-1'-yl)propyl amine (Formula XLIV, methods II, V).—The compound was produced by two different methods, i.e. (a) by the reduction of β-ionone with hydrogen and a platinum catalyst in the presence of di-ethyl amine at 70° C. Boiling point 114 to 116° C./0.8 mm. Equivalent weight 270 (calculated 251).

(b) By the reduction of N-acetyl-N-ethyl-dihydro-β-ionyl amine with lithium-aluminium hydride. The yield was 64%. Boiling point 108 to 109° C./1.4 mms. Equivalent weight 250 (calculated 251).

Example 45

N-METHYL-N-BENZYL DIHYDRO-β-IONYL-AMINE $N$ - benzyl - $N$ - 1 - dimethyl - 3 - (2',6',6' - trimethyl-cyclohexene-1'-yl)propyl amine (Formula XLV, method III).—10 gs. of N-methyl-dihydro-β-ionyl amine was boiled with 6.3 gs. of benzyl chloride in 75 mls. of absolute ethanol for 7 hours. To the solution was added 1.6 gs. of solid potassium hydroxide, after which the mixture was again boiled for 7 hours. A precipitate of potassium chloride was produced and filtered off. To the filtrate was added 25 mls. of 2 n-hydrochloric acid and 100 mls. of water.

This solution was extracted a few times with petroleum ether. The extracted solution was partly evaporated to dryness and rendered alkaline with 25 mls. of 50% caustic soda. The amine thus separated out was extracted with di-ethyl ether. The etheric extracts were dried on sodium sulphate, then filtered and evaporated. The residue was distilled in vacuo. The yield was 32%. Boiling point 174 to 175° C./0.8 mm. Equivalent weight 295 (calculated 299).

Example 46

N-(TETRAHYDRO-β-IONYL)PIPERIDINE

*N - [1 - methyl -3 - (2',2',6' - trimethyl-cyclohexyl)-propyl]piperidine (Formula XLVI, method III).*—32.6 gs. (0.125 mol) of tetrahydro-β-ionyl bromide was boiled with 40 mls. of piperidine for one and a half hours. After cooling the deposit formed of piperidinium bromide was sucked off and washed twice with dry di-ethyl ether. The ether of the filtrate was distilled off and the residue was again boiled for 5 hours. After cooling and sucking off again 4 gs. of piperidinium bromide was separated out. After evaporation of the ether from the filtrate the residue was fractionated in vacuo. The yield was 9.5 gs. (29%). Boiling point 118 to 119° C./0.5 mm. Equivalent weight 265 (calculated 265).

Example 47

N,N-DI-ISOPROPYL-ψ-IONYL AMINE

*N,N-di-isopropyl-1,5,9-trimethyldecyl amine (Formula XLVII, method III).*—10.5 gs. (0.04 mol) of hexahydro-ψ-ionyl bromide was mixed with 8 gs. of di-isopropyl amine. The mixture was heated for 10 hours at a temperature of 250° C. under pressure. Then, after cooling, the mixture was diluted with di-ethyl ether and the non-dissolved di-isopropyl amine hydrobromide formed (96% of the theoretically obtainable quantity) was filtered off. The amine formed was extracted from the filtrate by means of diluted hydrochloric acid. From this solution of the hydrochloric acid salt was separated the amine by means of caustic soda and it was extracted with di-ethyl ether. The etheric extract was evaporated to dryness. The residue had a weight of 0.17 g. (1.4%). Equivalent weight 299 (calculated 283).

Example 48

N-(HEXAHYDRO-ψ-IONYL)-2-METHYL PIPERIDINE

*N-(1,5,9-trimethyldecyl)-2-methyl piperidine (Formula XLVIII, method III).*—13 gs. of hexahydro-ψ-ionyl bromide was boiled with 50 gs. of 2-methyl-piperidine for 12 hours. Then first 40 gs. of 2-methyl-piperidine was distilled off, after which the residue was dissolved in 100 mls. of absolute di-ethyl ether. A deposit of 2-methyl piperidinium bromide was formed, which was filtered off and washed with di-ethyl ether. The di-ethyl ether of the filtrate was evaporated and the residue was distilled in vacuo. The yield was 6 gs. (43%). Boiling point 105 to 108° C./0.15 mm. Equivalent weight 289 (calculated 281).

Example 49

N-METHYL-N-ISOAMYL-DIHYDRO-β-IONYL AMINE

*N - 3 - dimethyl - N[1 - methyl - 3 - (2',6',6' - trimethyl-cyclohexene-1'-yl-) propyl] butyl amine (Formula XLIX, method III).*—21 gs. of N-methyl-dihydro-β-ionyl amine (0.1 mol) and 7.5 gs. of isoamyl bromide (0.05 mol) were boiled in 50 mls. of absolute ethanol for 11 hours, whilst the conditions were such that no moist could penetrate to the reaction mixture. Then the alcohol was evaporated and the residue was rendered alkaline by means of 50% caustic soda, this mixture was extracted a few times with di-ethyl ether and the etheric extracts together were dried on sodium sulphate and filtered. The filtrate was evaporated to dryness and the residue (23.8 gs.) was fractionated in vacuo. The yield was 6.5 gs. (47%). Boiling point 145 to 149° C./1.3 mms. Equivalent weight 283 (calculated 279).

Example 50

N,N-DIMETHYL-HEXAHYDRO-ψ-IONYL AMINE

*N,N - 1,5,9 - pentamethyl - decylamine (Formula L, method III).*—7.3 gs. of hexahydro-ψ-ionyl bromide (0.028 mol) and 12.5 gs. of 25% dimethyl amine solution (0.07 mol), dissolved in 100 mls. of ethanol, was boiled for 6 hours. After cooling the reaction mixture had added to it 30 mls. of 2 n hydrochloric acid; the mixture was shaken a few times with petroleum ether. The aqueous, alcoholic layer was rendered alkaline by means of 10 mls. of 50% caustic soda and extracted with petroleum ether. The latter extracts were collected and dried on solid sodium hydroxide, then filtered and evaporated to dryness. The residue (2.8 gs.) was distilled in vacuo. The yield was 2.1 gs. (33%). Boiling point 130 to 132° C./11 mms. Equivalent weight 227 (calculated 227).

Example 51

N-(TETRAHYDRO-ψ-IONYL) MORPHOLINE

*N-(1,5,9-trimethyldecene - 8 - yl)morpholine (Formula LI, method III).*—5.2 gs. of tetrahydro-ψ-ionyl bromide (0.02 mol) was dissolved in 10 mls. of ethanol. Thereto was added 5.5 gs. of morpholine (0.063 mol) and the mixture was boiled for one hour. After some time, after cooling, the brom hydric acid of morpholine crystalled out, which was filtered off. To the filtrate was added a small quantity of ethanol and 30 mls. of 2 n hydrochloric acid. This mixture was extracted a few times in succession with petroleum ether. To the aqueous, alcoholic layer was then added 5 mls. of 50% caustic soda. The layer was then extracted again with petroleum ether. The latter extracts were collected and dried on solid sodium hydroxide. After the solvent had been evaporated the residue was distilled in vacuo. The yield was 1.2 gs. (23%). Boiling point 157 to 158° C./2 mms. Equivalent weight 272 (calculated 267).

Example 52

N-ETHYL-N-(PHENYL-ISOPROPYL)TETRAHYDRO-ψ-IONYL AMINE

*N - ethyl-N-(1-methyl-2-phenylethyl)-1,5,9-trimethyl-decene-8-yl amine (Formula LII, method V).* (a) *N-phenyl-isopropyl-N-acetyl-tetrahydro-ψ-ionyl amine.*—To 13 gs. of N-phenyl-isopropyl-tetrahydro-ψ-ionyl amine was added 40 mls. of acetic acid anhydride. The mixture was boiled gently for one and a half hours. To the reaction mixture was then added a solution of 60 gs. of sodium chloride in 300 mls. of water and this solution was extracted a few times with 100 mls. of di-ethyl ether. The etheric extracts together were washed in succession with water, 3% aqueous sodium bicarbonate solution and water. The extracts were dried on sodium sulphate, filtered and the ether was evaporated. The residue (15 gs.) was distilled in vacuo. Yield 11.5 gs. (80%). Boiling point 180 to 186° C./0.04 mm.

(b) *N - ethyl-N-(phenyl-isopropyl)-tetrahydro-ψ-ionyl amine.*—11.5 gs. of N-phenyl-isopropyl-N-acetyl-tetrahydro-ψ-ionyl amine (0.032 mol), dissolved in 50 mls. of absolute di-ethyl ether, was added to a suspension of 8.6 gs. of lithium-aluminium hydride (0.23 mol) in 300 mls. of absolute di-ethyl ether. The mixture was boiled, whilst stirred (air being excluded) for 20 hours. The reaction mixture was decomposed by adding 500 mls. of moist di-ethyl ether and then 75 mls. of water. The filtrate was dried on sodium sulphate, after which the di-ethyl ether was evaporated. The residue (10 gs.) was distilled in vacuo. The yield was 8.5 gs. (77%). Boiling point 150 to 152° C./0.05 mm. Equivalent weight 344 (calculated 343).

Example 53

N-ETHYL-N-ISOAMYL TETRAHYDRO-ψ-IONYL AMINE

*N - ethyl-N-(3-methylbutyl)-1,5,9-trimethyldecene-8-yl* amine (Formula LIII, method V). (a) N-isoamyl-N-acetyl-tetrahydro-ψ-ionyl amine.—To 21 gs. of N-isoamyl-tetrahydro-ψ-ionyl amine (0.079 mol) was added 75 mls. of acetic acid anhydride, after which this mixture was boiled gently for one hour. The reaction mixture was, after cooling, poured in 600 mls. of water and extracted a few times with 100 mls. of di-ethyl ether. The etheric extracts together were washed a few times with 3% sodium bicarbonate solution and with water until the mixture reacted neutrally. Then the solution was dried on sodium sulphate, filtered and the ether was evaporated. The residue (29 gs.) was distilled in vacuo. The yield was 20 gs. (83%). Boiling point 184 to 186° C./0.8 mm.

(b) N-ethyl-N-isoamyl-tetrahydro-ψ-ionyl amine.—10 gs. of N - isoamyl - N - acetyl-tetrahydro-ψ-ionyl amine (0.032 mol) in 100 mls. of absolute di-ethyl ether was added to a suspension of 7.5 gs. of lithium-aluminium hydride (0.2 mol) in 275 mls. of absolute di-ethyl ether. This mixture was boiled, whilst stirred (the moist being excluded) for 12.5 hours. The reaction mixture was decomposed by means of 500 mls. of moist di-ethyl ether and then 75 mls. of water. The deposit was sucked off and the filtrate was dried on sodium sulphate. After filtering, the ether was evaporated. The residue (9.5 gs.) was distilled in vacuo. Yield 8.1 gs. (81%). Boiling point 155 to 159° C./0.8 mm. Equivalent weight 297 (calculated 295).

*Example 54*

N-ETHYL-N-(PHENYL-ISOPROPYL)-DIHYDRO-β-IONYL AMINE

N - ethyl - N - (1-methyl-2-phenylethyl)-1-methyl-3-(2',6',6' - trimethyl-cyclohexene - 1' - yl) propyl amine (Formula LIV, method V). (a) N - (phenylisopropyl)-N-acetyl-dihydro-β-ionyl amine.—To 10 gs. of N-phenyl-isopropyl-dihydro-β-ionyl amine (0.032 mol) was added 32 mls. of acetic acid anhydride and this mixture was boiled gently for 1.5 hours. To the cooled mixture was added a solution of 50 gs. of sodium chloride in 250 mls. of water and this mixture was extracted with 75 mls. of di-ethyl ether. The etheric extracts together were washed in succession with water, 3% aqueous sodium bicarbonate solution and water after which the extracted liquid was dried on sodium sulphate. The filtered, etheric solution was evaporated to dryness and the residue (11.3 gs.) was distilled in vacuo.

The yield was 10 gs. (gs. (86%). Boiling point 175 to 180° C./0.04 mm.

(b) N-ethyl - N - (phenyl-isopropyl)dihydro-β-ionyl amine.—10 gs. of N-phenyl-isopropyl N-acetyl-dihydro-β-ionyl amine (0.03 mol) dissolved in 50 mls. of absolute di-ethyl ether was added to a suspension of 7.5 gs. (0.2 mol) of lithium-aluminium hydride in 275 mls. of absolute di-ethyl ether. This mixture was boiled, whilst stirred for 18.5 hours, whilst moist was excluded. The reaction mixture was decomposed by adding 500 mls. of moist di-ethyl ether and then 75 mls. of water. The filtered solution was dried on sodium sulphate, after which the solvent was evaporated. The residue was distilled in vacuo. The yield was 7 gs. (73%). Boiling point 182 to 183° C./0.04 mm. Equivalent weight 342 (calculated 341).

*Example 55*

N-ETHYL-N-BUTYL-TETRAHYDRO-ψ-IONYL AMINE

N - ethyl - N - butyl-1,5,9-trimethyldecene-8-yl amine (Formula LV, method III and V). (a) N-butyryl-N-ethyl - tetrahydro - ψ - ionyl amine.—33.9 gs. (0.15 mol) of N - ethyl - tetrahydro - ψ - ionyl amine was dissolved with 12 gs. of dry pyridine in 100 mls. of dry benzene. Within 10 minutes a solution of 16 gs. of butyryl chloride, dissolved in 60 mls. of dry benzene was added in drops. After the addition the solution was boiled, whilst stirred, for five hours. From the cooled reaction mixture the deposit of pyridine hydrochloride was filtered off. The benzene of the filtrate was evaporated in vacuo, the residue was dissolved in 250 mls. of di-ethyl ether and washed twice with water. The etheric solution was dried on sodium sulphate, the ether was evaporated and the residue was distilled in vacuo. The yield was 34 gs. (76%). Boiling point 144 to 148° C./0.05 mm.

(b) N - ethyl-N-butyl-tetrahydro-ψ-ionyl amine.—33 gs. of N-ethyl-N-butyryl-tetrahydro-ψ-ionyl amine in absolute di-ethyl ether was added to a suspension of 10 gs. of lithium-aluminium hydride in absolute di-ethyl ether. After the addition the mixture was boiled, whilst stirred, for 20 hours. The reaction complex was decomposed by means of water and filtered. The etheric filtrate was dried on sodium sulphate and filtered, the ether was evaporated and the residue was distilled in vacuo. The yield was 26.5 gs. (84%). Boiling point 115 to 117° C./0.4 mm. Equivalent weight 286 (calculated 281).

*Example 56*

N-ETHYL-N-(3-METHYLBUTYL)-1,5-DIMETHYL-7-(2'-6',6'-TRIMETHYL-CYCLOHEXENE-1'-YL) HEPTYL AMINE (a) N-acetyl-N-(3-methylbutyl)-1,5-dimethyl-7-(2',6', 6'-trimethyl-cyclohexene-1'-yl)heptyl amine (Formula LVI, method V).—To 10.5 gs. of N-isoamyl-1,5-dimethyl-7-(2',6',6'-trimethyl-cyclohexene-1'-yl) heptyl amine was added 35 mls. of acetic acid anhydride. This mixture was boiled for 1.5 hours and then the surplus of acetic acid anhydride was distilled off in vacuo. The residue was distilled in vacuo. The yield was 10 gs. (85%). Boiling point 162 to 166° C./0.01 mm.

(b) N-ethyl-N-(3-methylbutyl)-1,5-dimethyl-7-(2',6', 6'-trimethyl-cyclohexene-1'-yl) heptyl amine.—10 gs. of N - acetyl - N-isoamyl-1,5-dimethyl-7-(2',6',6'-trimethyl-cyclohexene-1'-yl) heptyl amine was dissolved in 50 mls. of absolute di-ethyl ether and this solution was dripped within 30 minutes into a suspension of 1.8 gs. of lithium-aluminium hydride in 25 mls. of dry di-ethyl ether. After the addition the mixture was boiled, whilst stirred, for 16.5 hours. The reaction mixture was decomposed with 7.5 mls. of water and sucked off. The etheric filtrate was dried on sodium sulphate, the ether was evaporated and the residue was distilled in vacuo. The yield was 6.7 gs. (70%). Boiling point 170 to 172° C./0.8 mm. Equivalent weight 376 (calculated 363).

By converting secondary amines into acidic amides and by reducing the latter by means of lithium-aluminium hydride, a few tertiary tetrahydro-ψ-ionyl amines were produced, which are indicated hereinafter in the table. The acidic amides were produced by formylation with the aid of formic acid and acylation with the aid of anhydrides or acidic chlorides, for example acetic acid anhydride or chloride. In this table it is indicated that from secondary tetrahydro-ψ-ionyl amines, which have a group $Q_1$ bound to the nitrogen atom, derivates were produced by acylation with the aforesaid acylating agents, in which derivatives not only the group $Q_1$ but also an acyl-group ($Q_2'$) is bound to the nitrogen atom, this group being then converted by reduction with lithium-aluminium hydride or a similar reducing agent, for example, sodium-boron hydride or magnesium-aluminium hydride, into tertiary-tetrahydro-ψ-ionyl amines, in which the groups $Q_1$ and $Q_2$ are bound to the nitrogen atom (after the groups $Q_2'$ and $Q_2$ are indicated the boiling points in degrees centigrade at a given pressure in mms. Hg for the compounds in which the groups $Q_1$, $Q_2$ respectively are bound to the nitrogen atom).

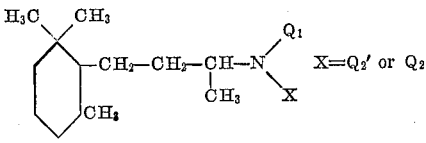

| Q1 | Ex. No. | Q2' | Boiling point, Q1, Q2' | Q2 | Boiling point, Q1, Q2 | Formula |
|---|---|---|---|---|---|---|
| $CH_3$ | 57 | $-CO-CH_3$ | 128-134/0.05 | $-C_2H_5$ | 121-131/1 | LVII |
| $-CH_2-CH_2-CH_3$ | 58 | $-CO-H$ | 142-143/0.05 | $-CH_3$ | 114-115/1 | LVIII |
| $-CH-CH_3$ <br> $\quad\ \ CH_3$ | 59 | $-CO-H$ | 140-144/0.7 | $-CH_3$ | 103-105/0.7 | LIX |
| $-CH_2-CH_3$ | 60 | $-CO-CH_3$ | 136-137/0.6 | $-CH_2-CH_3$ | 103-105/0.7 | LX |
| $-CH_2-CH_2-CH_3$ | 61 | $-CO-CH_3$ | 140-142/0.5 | $-CH_2-CH_3$ | 108-109/0.5 | LXI |
| $-CH-CH_3$ <br> $\quad\ \ CH_3$ | 62 | $-CO-CH_3$ | 134-135/0.07 | $-CH_2-CH_3$ | 109-112/0.8 | LXII |
| $-CH_2-CH_3$ | 63 | $-CO-CH_2-CH_2-CH-CH_3$ <br> $\qquad\qquad\qquad\ \ CH_3$ | 150-152/0.08 | $-(CH_2)_3-CH-CH_3$ <br> $\qquad\qquad\ \ CH_3$ | 138-140/1.1 | LXIII |
| $-CH-CH_2-CH-CH_3$ <br> $\ \ CH_3\qquad CH_3$ | 64 | $-CO-CH_3$ | 140-142/0.07 | $-CH_2-CH_3$ | 115-120/0.6 | LXIV |
| $-CH_2-CH_2-CH_3$ | 65 | $-CO-CH_2-CH_3$ | 141-143/0.5 | $-CH_2-CH_2-CH_3$ | 107-109/0.3 | LXV |
| $-CH-CH_3$ <br> $\quad\ \ CH_3$ | 66 | $-CO-CH_2-CH_3$ | 102-104¹ | $-CH_2-CH_2-CH_3$ | ---------- | LXVI |
| $-CH_2-CH_2-CH-CH_3$ <br> $\qquad\qquad\ \ CH_3$ | 67 | $-CO-CH_2-CH_3$ | 175-177/2 | $-CH_2-CH_2-CH_3$ | 105-108/0.03 | LXVII |
| $-CH_2-CH_2-CH-CH_3$ <br> $\qquad\qquad\ \ CH_3$ | 68 | $-CO-CH_2-CH_2-CH_3$ | 190-194/2.5 | $-CH_2-CH_2-CH_2-CH_3$ | 152-154/1.5 | LXVIII |
| $-CH_2-CH_2-CH-CH_3$ <br> $\qquad\qquad\ \ CH_3$ | 69 | $-CO-(CH_2)_2-CH-CH_3$ <br> $\qquad\qquad\qquad\ CH_3$ | 200-210/3.5 | $-(CH_2)_3-CH-CH_3$ <br> $\qquad\qquad\ CH_3$ | 164-165/1.6 | LXIX |

¹ Melting point.

PRIMARY AMINES
FORMULA I     METHOD II
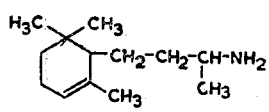
FORMULA II     II
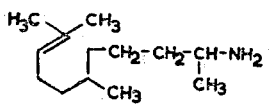
FORMULA III     IV
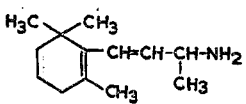
FORMULA IV     VI
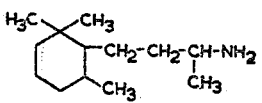
SECONDARY AMINES
FORMULA V     I
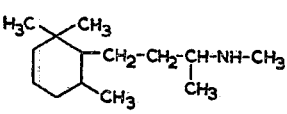
FORMULA VI     I
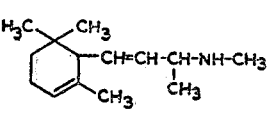
FORMULA VII     I
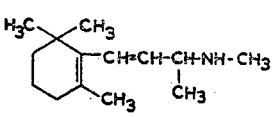
SECONDARY AMINES—Continued
FORMULA VIII     METHOD II
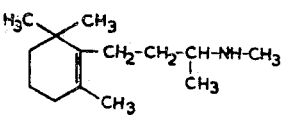
FORMULA IX     II
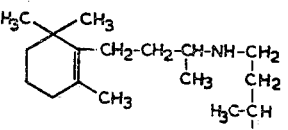
FORMULA X     II
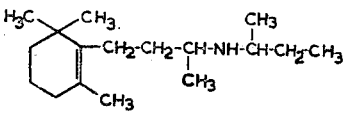
FORMULA XI     II
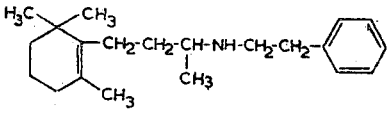
FORMULA XII     II
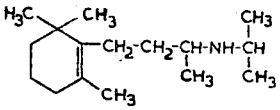
FORMULA XIII     II
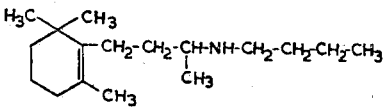
FORMULA XIV     II
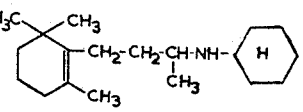

SECONDARY AMINES—Continued
| FORMULA | | METHOD |
|---|---|---|
| XV | 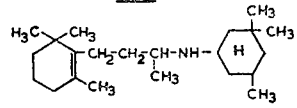 | II |
| XVI | 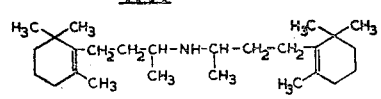 | II |
| XVII | 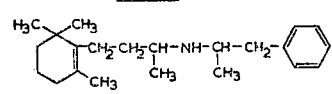 | II |
| XVIII | 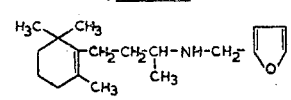 | II |
| XIX | 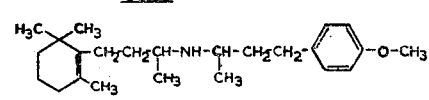 | II |
| XX | 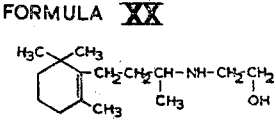 | II |
| XXI | 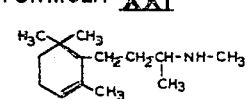 | II |
| XXII | 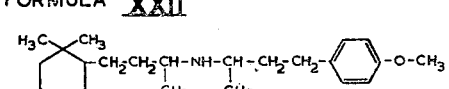 | II |
SECONDARY AMINES—Continued
| FORMULA | | METHOD |
|---|---|---|
| XXIII | 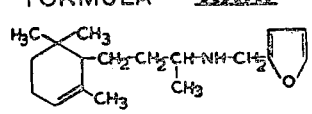 | II |
| XXIV | 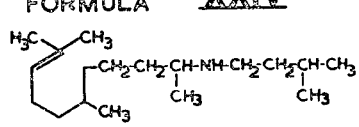 | II |
| XXV | 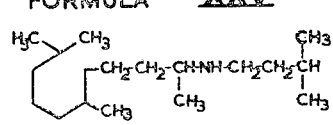 | II |
| XXVI | 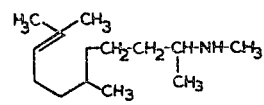 | II |
| XXVII | 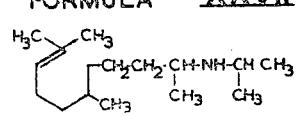 | II |
| XXVIII | 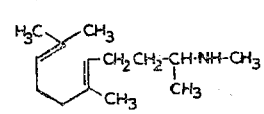 | II |
| XXIX | 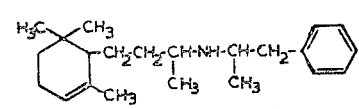 | II |
| XXX | 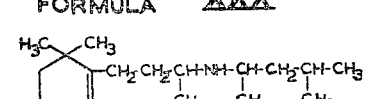 | II |
| XXXI | 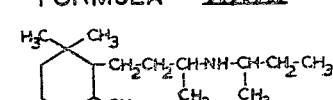 | II |

SECONDARY AMINES—Continued
| FORMULA | | METHOD |
|---|---|---|
| XXXII 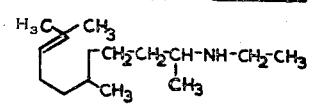 | | II |
| XXXIII 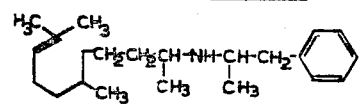 | | II |
| XXXIV 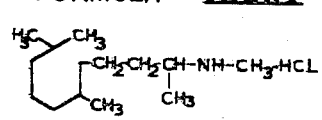 | | II |
| XXXV 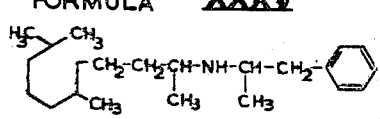 | | II |
| XXXVI 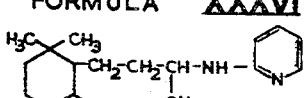 | | III |
| XXXVII 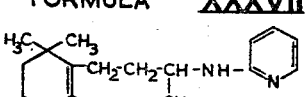 | | III |
| XXXVIII 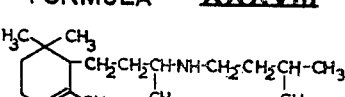 | | III |
| XXXIX 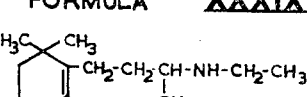 | | V |
| XL 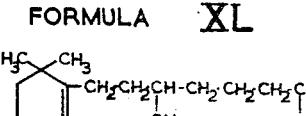 | | II |
SECONDARY AMINES—Continued
| FORMULA | | METHOD |
|---|---|---|
| XLI 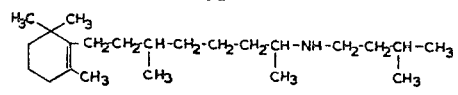 | | II |
| XLII 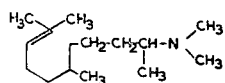 | | V |
TERTIARYAMINES
| FORMULA | | METHOD |
|---|---|---|
| XLIII 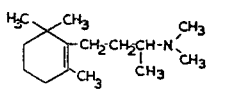 | | II |
| XLIV 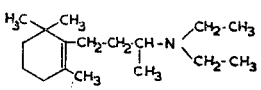 | | IIV |
| XLV 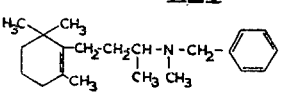 | | III |
| XLVI 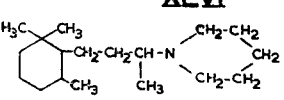 | | III |
| XLVII 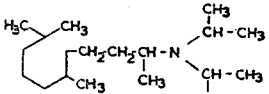 | | III |
| XLVIII 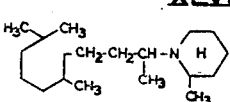 | | III |
| XLIX 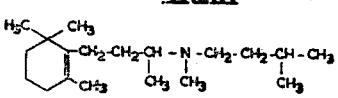 | | III |

TERTIARYAMINES—Continued
| FORMULA | | METHOD |
|---|---|---|
| L | 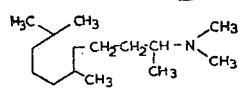 | III |
| LI | 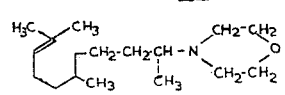 | III |
| LII | 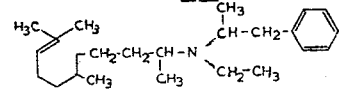 | V |
| LIII | 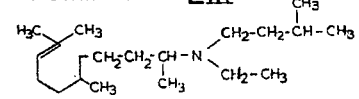 | V |
| LIV | 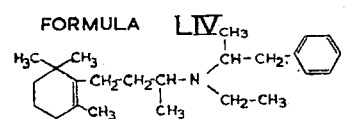 | V |
| LV | 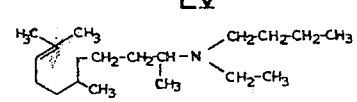 | III, V |
| LVI | 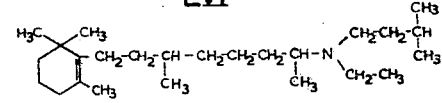 | V |
| LVII | 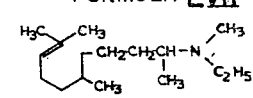 | V |
| LVIII | 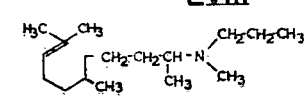 | V |
TERTIARYAMINES—Continued
| FORMULA | | METHOD |
|---|---|---|
| LIX | 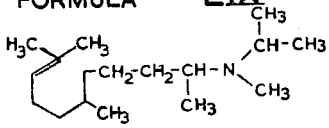 | V |
| LX | 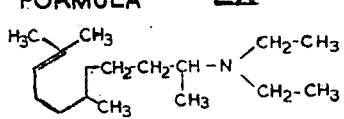 | V |
| LXI | 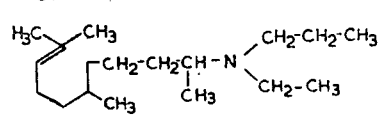 | V |
| LXII | 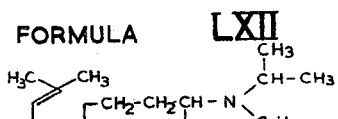 | V |
| LXIII | 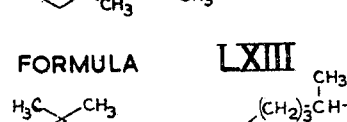 | V |
| LXIV | 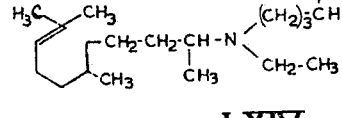 | V |
| LXV | 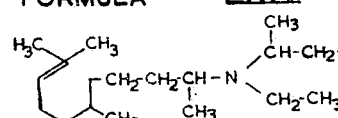 | V |
| LXVI | 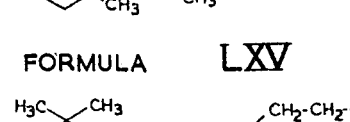 | V |
| LXVII | 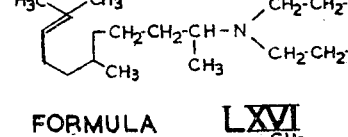 | V |

TERTIARYAMINES—Continued

FORMULA LXVIII    METHOD

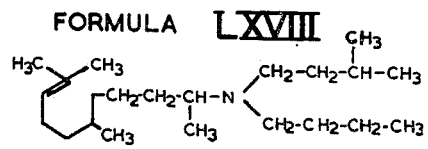

V

FORMULA LXIX

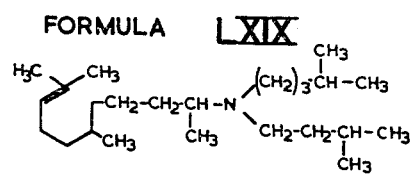

V

What is claimed is:
An amine having spasmolytic properties and corresponding to the structral formula

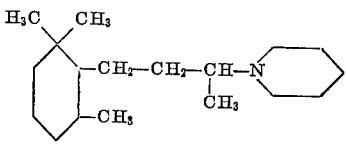

References Cited in the file of this patent

UNITED STATES PATENTS

| | | |
|---|---|---|
| 1,065,159 | Merling | June 17, 1913 |
| 2,409,287 | Kharasch | Oct. 15, 1946 |
| 2,501,509 | Gresham | Mar. 21, 1950 |
| 2,774,766 | Goldberg | Dec. 18, 1956 |

OTHER REFERENCES

Stedman: Medical Dictionary, 17th revised ed., The Williams and Wilkins Co., Baltimore (1949), pages 77–1106.

Wagner and Zook: "Synthetic Org. Chem.," pages 662–3 (1953).